United States Patent [19]
McVicker et al.

[11] Patent Number: 4,522,928
[45] Date of Patent: Jun. 11, 1985

[54] REMOVAL OF METAL COMTAMINANTS FROM CATALYSTS USING BUFFERED OXALIC ACID

[75] Inventors: Gary B. McVicker; James L. Carter, both of Westfield; Lawrence L. Murrell, S. Plainfield; John J. Ziemiak, Annandale, all of N.J.

[73] Assignee: Exxon Research and Engineering Co., Florham Park, N.J.

[21] Appl. No.: 610,096

[22] Filed: May 14, 1984

Related U.S. Application Data

[63] Continuation-in-part of Ser. No. 434,730, Oct. 18, 1982, abandoned.

[51] Int. Cl.$^3$ .................... B01J 23/96; B01J 23/94; B01J 23/92
[52] U.S. Cl. ..................... 502/26; 208/140; 423/27; 423/54; 423/68; 423/98; 423/139; 423/150; 423/181; 502/28; 502/516
[58] Field of Search ............ 502/28, 27, 29, 33, 502/26, 516; 208/140; 423/139, 150

[56] References Cited

U.S. PATENT DOCUMENTS

| | | | |
|---|---|---|---|
| 2,380,731 | 7/1945 | Drake et al. | 502/28 |
| 2,704,281 | 3/1955 | Appell | 502/27 |
| 3,020,239 | 2/1962 | Flinn et al. | 502/28 |
| 3,122,511 | 2/1964 | Foster | 502/28 |
| 3,213,033 | 10/1965 | Hindin et al. | 502/516 |
| 3,536,637 | 10/1970 | Noll et al. | 260/2.2 |
| 3,791,989 | 2/1974 | Mitchell et al. | 502/28 |
| 4,089,806 | 5/1978 | Farrell et al. | 502/28 |
| 4,122,000 | 10/1978 | Farrell et al. | 208/210 |

FOREIGN PATENT DOCUMENTS

| | | |
|---|---|---|
| 356523 | 9/1931 | United Kingdom . |
| 589796 | 6/1947 | United Kingdom . |
| 1245358 | 9/1971 | United Kingdom . |

*Primary Examiner*—P. E. Konopka
*Attorney, Agent, or Firm*—Henry E. Naylor

[57] ABSTRACT

A process for removing metal contaminants from a hydroconversion catalyst, said catalyst containing at least one metal from Groups VIB, VIIB or VIII supported on a refractory inorganic oxide. The process comprises contacting the contaminated catalyst with a buffered oxalic acid solution wherein contaminant is removed without dissolving the support.

19 Claims, No Drawings

REMOVAL OF METAL COMTAMINANTS FROM CATALYSTS USING BUFFERED OXALIC ACID

CROSS-REFERENCE TO RELATED APPLICATIONS

This application is a continuation-in-part of U.S. Ser. No. 434,730 filed Oct. 18, 1982, now abandoned.

BACKGROUND OF THE INVENTION

This invention relates to the removal of metal contaminants from hydroconversion catalysts. More particularly, metal contaminants are selectively removed from catalysts on refractory oxide supports by treatment with buffered oxalic acid solutions without dissolving the support.

Hydroconversion catalysts used to treat petroleum feedstocks become deactivated due to factors such as coke build-up and contamination by metals typically found in crude oil. It is known to use acids in the process of regenerating hydroconversion catalysts. U.S. Pat. No. 2,380,731 relates to the removal of iron and other metals from catalytic cracking catalysts by treating spent catalysts with organic acids and dilute mineral acids. Aqueous solutions of oxalic acid are preferred. U.S. Pat. No. 3,020,239 describes the removal of vanadium from molybdenum containing catalysts using aqueous glycolic acid solution. Other hydroxy acids and compounds similar to glycolic acid are unsatisfactory because of a concomitant removal of molybdenum. Concentration control is preferred to avoid leaching of aluminum from support material. U.S. Pat. No. 3,791,989 teaches the removal of vanadium from a hydroprocessing catalyst containing a Group VI or Group VIII metal by contacting the catalyst with an aqueous solution of oxalic acid before burning off any coke deposits. In example 1, fouled catalyst particles were boiled with concentrated oxalic acid solution with a preferential removal of vanadium over nickel or molybdenum. A reverse order is described in British Pat. No. 1,245,358 whereby deactivated Group VI or VIII catalyst on a carrier is first subjected to a coke burn-off followed by washing with aqueous oxalic acid solution having a concentration of 0.5M to saturation. Catalytic metal is not removed provided contact time with oxalic acid is limited.

In U.S. Pat. Nos. 4,089,806 and 4,122,000, hydrodesulfurization catalysts containing Groups VIB and/or VIII metals on a refractory support are regenerated using a combination of oxalic acid plus nitric acid and/or nitrate salts. The use of oxalic acid alone in environments severe enough to remove substantial amounts of vanadium is stated to result in dissolution of alumina support. Finally, according to U.S. Pat. No. 3,536,637, iron fouled ion exchange materials are rejuvenated by contacting fouled resin with oxalic acid.

While it is known that oxalic acid is useful for removing certain metal contaminants from hydroconversion catalysts supported on inorganic oxides such as alumina, oxalic acid suffers from the disadvantage of also removing or dissolving catalytic metals and support materials.

SUMMARY OF THE INVENTION

It has been discovered that the above-cited disadvantages may be overcome without any harmful effect on the ability of oxalic acid to remove metal contaminants if the aqueous oxalic acid solution is buffered. Accordingly, the process of the invention for removing metal contaminants from a hydroconversion catalyst containing at least one metal from Groups VIB, VIIB or VIII supported on a refractory inorganic oxide comprises contacting the contaminated catalyst with a buffered aqueous oxalic acid solution. In another embodiment, metal contaminants are removed from a catalytic cracking catalyst, said cracking catalyst containing at least one of alumina, silica, silica-alumina, zeolites or clays, by a process which comprises contacting the contaminated cracking catalyst with a buffered aqueous oxalic acid solution.

The present process employing buffering permits the use of oxalic acid at varying concentrations without dissolution of metal oxide supports typically employed in hydroconversion catalysts. Moreover, long contact times for oxalic acid solution with contaminated catalyst are possible without removal of the catalytically active metal from support, even at elevated extraction temperatures. Buffering oxalic acid also permits its use for regenerating catalytic cracking catalysts without dissolving the catalyst.

DETAILED DESCRIPTION OF THE INVENTION

Hydroconversion catalysts of interest are those wherein either the active catalytic component or the support material is susceptible to attack by mineral and/or organic acids. In usual commercial use, these catalysts become fouled with metal contaminants and coke formation, leading to catalyst deactivation. Acid regeneration of deactivated catalysts is used to remove metal contaminants. If the support or catalyst is susceptible to acid attack, however, there is a substantial problem since loss of support can also lead to loss of active catalytic component. Such losses are frequently unacceptable or contact time between acid and fouled catalyst is limited to such an extent that substantial amounts of metal contaminant cannot be removed.

Hydroconversion catalysts of particular interest include cracking catalysts, reforming catalysts and resid conversion catalysts. Catalytic cracking catalysts are acidic metal oxides such as alumina, silica-alumina, zeolites, clays, especially acid treated clays, silica-zirconia, silica magnesia, alumina-boria and silica-titania. The combination of the above-cited cracking catalysts as support with a hydrogenation-dehydrogenation metal, e.g., Co, Ni, W, V, Mo, Pt, Pd, Ir or combinations thereof, results in a hydrocracking catalyst. In general, the combination of a Group VIB metal, Group VIIB, Group VIII metal or mixture thereof supported on an acidic support as described above are used for a variety of catalytic hydroconversions, such as resid conversion and reforming. Groups are defined in the Periodic Table on p. 662 of the 9th ed. of the Condensed Chemical Dictionary. Preferred catalytic materials are alumina, silica-alumina or zeolites as supports for Co, Mo, Re or platinum group metals, either alone or in combination.

Metal contaminants may arise from either feedstock or metal components used in the fabrication of reactors and transfer lines. Examples of metal contaminants which may be removed by oxalic acid are iron, vanadium, nickel, sodium, magnesium, chromium, copper, strontium, lithium, lead and the like. Such metals are generally undesirable since they may lead to catalyst deactivation by catalyst poisoning, plugging or both.

As noted hereinbefore, oxalic acid extractions for removing metal contaminants may also result in acid attack of susceptible supports, active catalytic metals or both. Moreover, some oxalic acid treatments require high temperatures amd/or high concentrations of acid thus exacerbating the above-stated problems. It has been discovered that buffering the oxalic acid obviates these problems without interfering with the ability of oxalic acid to extract metal contaminants.

Buffering agents according to the invention are those which are capable of buffering aqueous oxalic acid solutions within a pH range of from 2 to 10, preferably 3 to 8.5. Preferred buffering agents are those which do not contain a Group IA or Group IIA cation in an amount sufficient to casue catalyst poisoning.

Examples of preferred buffers are ammonium salts of weak organic acids, e.g., ammonium acetate, ammonium citrate, ammonium formate, ammonium lactate, ammonium valerate, ammonium proprionate, ammonium urate, etc., or mixtures thereof. Mixtures of different buffers are known to extend the range of pH which can be controlled compared to the separate buffers. The use of the ammonium salts of weak organic acids precludes the possible adverse effect of adsorption of the cations of alkali and alkaline buffers. Such cations are known to be severe poisons for many hydroconversion catalysts.

The use of metal chelating buffers may also be used to aid in the selective removal of metal contaminants from hydroconversion catalysts. Oxalic acid itself is known to chelate and to remove niobium and zirconium from ion exchange columns ("The Chemistry of Lanthanides", T. Moeller, Reinhold Publishing Corporation, New York, 1963, p81–85). Buffers which have differing metal-binding abilities are: $NH_2COCH_2NHCH_2CH_2SO_3H$, $NH_2COCH_2N(CH_2COOH)_2$, bicine, glycylglycine,

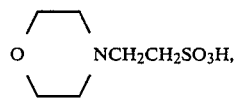

tricine. ("Buffers for pH and Metal Ion Control," D. D. Perrin and B. Dempsey, John Wiley and Sons, New York, p108). Glycine derivatives are known to be strong complexing agents toward iron and other metals. Hexanoic and Di(o-hydroxyphenyl) acetic acid are also known to be strong complexing agents for iron and other metals, and may be added to buffer compositions ("Photometric and Fluorometric Methods of Analysis. Metals Part 1," F. D. Snell, John Wiley and Sons, New York, 1978, p763). Enhancement in the rate and extent of metal contaminant removal from a hydroconversion catalyst by utilizing a strong complexing agent in the buffer solution, in addition to oxalate ions, can lead to an improved metal contaminant extraction scheme.

Another class of buffers for metal contaminant removal from hydroconversion catalysts involve buffers useful in aqueous/non-aqueous solvent systems such as methanol/water systems. (See "Buffers for pH and Metal Ion Control," D. D. Perrin and B. Dempsey, John Wiley and Sons, New York, 1974, p84–88.) Aqueous/nonaqueous systems are useful for metal contaminant removal from hydroconversion catalysts as alumina solubilization in some instances may be reduced compared to aqueous systems.

The amount of buffer required is dependent on the concentration of oxalic acid employed. Oxalic acid concentrations may range from 0.0001M to 5.0M, and concentration ranges of from 0.01 to 2.0M are preferred. The amount of buffer required is that sufficient to maintain the pH of oxalic acid within the desired range. Increasing the concentration of oxalic acid will generally require greater amounts of any given buffer, depending on the buffering capacity.

Temperature ranges are from about 0° C. to about 100° C., preferably 20° to 80° C. Higher temperatures may lead to excessive acid attack on the support and/or catalytic metal without any particular benefit with respect to removal of metal contaminants.

Unlike conventional oxalic acid, buffered oxalic acid can be contacted with deactivated catalysts for prolonged periods without dissolution of support materials. The manner of contacting catalyst and buffered oxalic acid solution is not critical. Deactivated catalyst may be slurried in buffered oxalic acid solution. Samples of catalyst or buffered oxalic acid solution can then be removed at fixed intervals to monitor extent of metal decontamination. Alternatively, catalyst may be continuously extracted, for example, in a countercurrent extractor with buffered oxalic acid recycle.

A preferred embodiment for removal of metal contaminants from hydroconversion catalysts relates to the regeneration of reforming catalysts which typically contain Pt either alone or in combination with another metal, preferably Re or a noble metal, on an acidic support such as alumina or silica-alumina. Reforming catalysts gradually become contaminated with metals such as Fe, Pb, Cu, Ca, Na and the like with Fe being particularly troublesome.

When 0.5M oxalic acid is slurried with Fe contaminated Pt, Pt/Ir or Pt/Re catalysts on $\gamma$-$Al_2O_3$ and heated, substantial amounts of support and noble metal are removed along with the desired Fe contaminant. On the other hand, an ammonium acetate buffered oxalic acid extraction of the same catalyst systems results in a selective removal of Fe with only very small losses of catalyst which are attributed to mechanical losses rather than chemical attack on the $\gamma$-alumina support. For Fe removal using buffered oxalic acid solutions, lower temperatures of from 20° to 80° C. are favored.

Following extraction, a Pt/Re catalyst was calcined in the presence of $O_2$ at 500° C. for four hours. $H_2$ and CO chemisorption values of regenerated catalyst were nearly the same as those of fresh catalyst indicating no poisoning or surface modification by buffered oxalic acid treatment.

An Fe extracted Pt/Ir catalyst was compared against the non-extracted catalyst containing 0.35 wt.% Fe and a fresh Pt/Ir catalyst for naptha reforming activity. After 400 hours, the extracted catalyst showed only a 25% lower reforming activity relative to the fresh catalyst compared to a 70% decline in reforming activity for the catalyst which had not been extracted with buffered oxalic acid solution.

The process of the invention is further illustrated by the following examples.

CATALYSTS

Catalysts were supported on $\gamma$-$Al_2O_3$ supports having BET surface areas of from 150–190 $m^2/g$.

Pt/Re/$Al_2O_3$. The platinum-rhenium bimetallic catalyst was a commerical sample with an initial composition of 0.3% Pt, 0.3% Re and 0.9% Cl (all percentages are weight percent unless otherwise indicated).

Pt/Ir/Al$_2$O$_3$. Platinum-iridium bimetallic catalysts employed were commercial samples. The fresh catalyst contains 0.3% Pt, 0.3% Ir and 0.7% Cl. A number of used Pt/Ir/Al$_2$O$_3$ samples were also obtained from commercial refineries.

Pt/Al$_2$O$_3$. The monometallic platinum catalyst was a commercial sample with a composition of 0.3% Pt and 0.7% Cl.

Iron Doped Catalysts. Known quantities of Fe were added to fresh Pt/Re/Al$_2$O$_3$ and Pt/Ir/Al$_2$O$_3$ catalysts by an incipient wetness procedure using standardized, aqueous iron nitrate solutions. After drying under air at 120° C. for 16 hours, the impregnates were calcined at 270° C. for four hours under 20% O$_2$/He (500 cc/min.) to insure decomposition of the nitrate salt.

EXAMPLE 1

This example demonstrates the harmful effects of Fe on the chemisorption properties of noble metal bimetallic catalysts. Hydrogen and carbon monoxide chemisorption studies were performed with a conventional glass vacuum system as described by Sinfelt and Yates in J. Catal., 8, 82 (1967).

Hydrogen and carbon monoxide uptakes were determined at 25±2° C. on the reduced and evacuated samples. Typically, 30 minutes were allowed for each uptake point. H/M ratios were calculated by assuming that hydrogen uptake at zero pressure corresponds to saturation coverage of the metal. Hydrogen uptake at zero pressure was determined by extrapolation of the high pressure linear portion of the isotherm as described by Benson and Boudart and Wilson and Hall (J. Catal., 4, 704 (1965) and 17, 190 (1970). CO/M ratios were calculated by determining the carbon monoxide uptakes on the reduced and evacuated samples and assuming that this quantity represented the sum of carbon monoxide weakly bound to the Al$_2$O$_3$ support and strongly bound to the metal surface. The sample was then evacuated (10$^{-5}$ Torr) for 10 minutes at room temperature and a second carbon monoxide isotherm measured. Since the second isotherm measures only the carbon monoxide weakly adsorbed on the support, subtraction of the two isotherms gives the quantity of carbon monoxide strongly associated with the metal components. The amount of strongly bound carbon monoxide at 100 Torr was chosen as saturation coverage of the metal.

The hydrogen chemisorption properties of fresh and iron doped Pt/Re and Pt/Ir catalysts are summarized in Table 1.

TABLE 1

Hydrogen Chemisorption Properties of Iron Doped Pt/Re and Pt/Ir on Alumina Catalysts

| Catalyst | % Fe[a] | H/M[b] | D/Do[c] |
| --- | --- | --- | --- |
| 0.3% Pt/0.3% Re/Al$_2$O$_3$ | 0 | 0.4 | 100 |
|  | 0.10 | 0.3 | 75 |
|  | 0.36 | 0.2 | 50 |
| 0.3% Pt/0.3% Ir/Al$_2$O$_3$ | 0 | 1.7 | 100 |
|  | 0.05 | 1.4 | 82 |
|  | 0.10 | 1.3 | 76 |
|  | 0.36 | 1.0 | 59 |
|  | 0.80 | 0.8 | 47 |

[a]Iron added as the nitrate salt. Following iron impregnation the catalysts were calcined at 270° C. under 20% O$_2$/He (500 cc/min) for 4.0 hr to ensure decomposition of the nitrate salt.
[b]Atoms of hydrogen chemisorbed per metal atom in the catalysts at room temperature. Prior to chemisorption measurements, the catalysts were reduced at 500° C. under H$_2$ (500 cc/min) for 2.0 hr.
[c]Normalized dispersions In the last column of Table 1, the hydrogen uptakes of the iron doped catalysts have been normalized with respect to the uptakes of the fresh Pt/Re and Pt/Ir catalysts. Systematic decreases in hydrogen chemisorption capacity for both bimetallic catalysts were observed with increasing iron concentrations. At an iron concentration of 0.36%, the hydrogen uptakes of the bimetallic catalysts are 40-50% lower than those exhibited by fresh samples. The Fe/noble metal mole ratios for catalysts containing 0.1 to 0.8% Fe range from 0.5 to 4. A 0.2% iron concentration would thus be high enough to interact with all the noble metal components present in Pt/Re and Pt/Ir reforming catalysts. The marked decreases in H/M values caused by low iron concentrations suggest in fact that iron is either alloying with or physically blocking a sizeable fraction of the noble metals. A decreased chemisorption capacity could potentially lower reforming activity since H—H and C—H bond activation processes are extremely important in catalytic reforming.

EXAMPLE 2

The effects of iron on the reforming activities of bimetallic catalysts is shown in this example. Naphtha reforming reactions were carried out in a 25 ccc, stainless steel, fixed-bed, isothermal hydrotreating unit operated in a single pass mode.

Reforming experiments were performed at 487°–489° C. under 200 psig total pressure. The weight hour space velocity was 2.1 WHW and hydrogen was supplied at a rate of 6000 SCF H$_2$/BBL. A commercial naphtha feedstock was utilized and the sulfur concentration adjusted to 0.5 ppm by the addition of thiophene. Following hydrogen reduction at 500° C., the catalysts were sulfided using a dilute H$_2$S/H$_2$ mixture. Reformate was analyzed for research octane number (RON). Octane numbers were used to define relative catalyst activities (RCA).

The naphtha reforming activities of fresh and iron doped Pt/Re and Pt/Ir catalysts are compared in Table 2.

TABLE 2

Naphtha Reforming Activities of Iron Doped Pt/Re and Pt/Ir on Alumina Catalysts

| Catalyst[a] | % Fe | HRS on Feed | RON[b] | RCA[c] |
| --- | --- | --- | --- | --- |
| 0.3% Pt/0.3% Re/Al$_2$O$_3$ | 0 | 158 | 99.3 | 81 |
|  |  | 278 | 99.1 | 74 |
|  |  | 422 | 97.6 | 56 |
| 0.3% Pt/0.3% Re/Al$_2$O$_3$ | 0.36 | 162 | 95.3 | 47 |
|  |  | 282 | 90.6 | 33 |
| 0.3% Pt/0.3% Ir/Al$_2$O$_3$ | 0 | 165 | 101.5 | 128 |
|  |  | 285 | 101.6 | 125 |
|  |  | 309 | 101.3 | 126 |
| 0.3% Pt/0.3% Ir/Al$_2$O$_3$ | 0.36 | 166 | 97.0 | 58 |
|  |  | 285 | 93.4 | 46 |

[a]Same catalysts as described in Table I
[b]RON = research octane number
[c]RCA = relative catalyst activity Relative catalyst activities clearly show that 0.36% iron has a pronounced deleterious effect on both of the bimetallic catalysts. Similar coke makes were found for all the catalysts. The 55-65% lower activities exhibited by the iron containing catalysts indicates that the noble metals are deactivated by interaction with iron. Since the Fe/noble metal mole ratio is near 2 in these catalysts, there is enough iron available to modify all the Pt, Ir and Re. The decreased reforming activities are in agreement with the reduced hydrogen chemisorption capacities found for the iron doped catalysts.

EXAMPLE 3

The solubilities of γ-$Al_2O_3$ in $H_2O$, oxalic acid and ammonium acetate buffered oxalic acid solutions are compared in Table 3.

TABLE 3

Solubility of γ-$Al_2O_3$ in Aqueous Oxalic Acid and Buffered Oxalic Acid Solutions

| Treatment[a] | | Solution pH | | | γ-$Al_2O_3$ Recovered (%)[b] | | |
|---|---|---|---|---|---|---|---|
| T °C. | min. | $H_2O$ | O.A. | B.O.A. | $H_2O$ | O.A. | B.O.A. |
| 100 | 15 | 7.6 | 0.6 | 4.2 | 100 | 85 | 99 |
| 100 | 30 | 4.9 | 2.0 | 4.4 | 100 | 52 | 100 |

[a]5.0 gm of γ-$Al_2O_3$ refluxed in 50 ml aqueous solutions of neat $H_2O$, 0.5 M oxalic acid (O.A.) and 0.5 M oxalic acid plus 0.5 M ammonium acetate (B.O.A.). γ-$Al_2O_3$ in the form of 1/16 inch extrudates.
[b]The recovered catalysts were rinsed with four 50 ml aliquots of distilled $H_2O$ and then dried at 120° C. for 16 hours.

After refluxing in $H_2O$ for 30 min., the pH of an γ-$Al_2O_3$ slurry reaches a self-buffering level of about 5.0. The acidic nature of $Al_2O_3$—$H_2O$ slurries is well-known in the art. A slurry of $Al_2O_3$ in oxalic acid exhibits a pH of around 2 at 100° C. Thus, the acidity of an $Al_2O_3$-oxalic acid slurry is approximately three-orders of magnitude greater than that of an $Al_2O_3$—$H_2O$ slurry. An $Al_2O_3$-ammonium acetate buffered oxalic acid slurry, in contrast to the oxalic acid slurry, was observed to maintain a relatively constant pH value of around 4.4. Thus, the pH of the buffered slurry is similar in value to that of an aqueous slurry of $Al_2O_3$. The effects of pH are reflected in the quantities of $Al_2O_3$ which can be recovered unchanged from the slurries. Essentially complete recovery of $Al_2O_3$ was achieved from the $H_2O$ and buffered oxalic acid slurries. Oxalic acid slurries, however, readily dissolve substantial quantities of $Al_2O_3$. After refluxing for 30 min. nearly half of the starting quantity of $Al_2O_3$ was transformed into a soluble aluminum species.

EXAMPLE 4

This example illustrates the non-selective extraction of iron from noble metal catalysts. The results of representative studies using oxalic acid solutions for extracting iron from Pt, Pt/Ir and Pt/Re catalysts are presented in Table 4.

TABLE 4

Non-Selective Extraction of Iron from Alumina Supported Noble Metal Catalysts Using Aqueous Oxalic Acid Solutions

| Starting Catalyst (wt. % Metals)[c] | | | | Treatment[a] | | Recovered[b] Catalyst | Extracted Catalysts (wt. % Metals)[c] | | | |
|---|---|---|---|---|---|---|---|---|---|---|
| Pt | Ir | Re | Fe | T °C. | min | (wt. %) | Pt | Ir | Re | Fe |
| 0.29 | — | — | 0.35 | 50 | 60 | 90 | 0.29 | — | — | 0.08 |
|  |  |  |  | 100 | 60 | 72 | 0.17 | — | — | 0.10 |
| 0.29 | 0.29 | — | 0.80 | 100 | 10 | 79 | 0.15 | 0.19 | — | 0.02 |
|  |  |  |  | 100 | 120 | 38 | 0.10 | 0.14 | — | 0.03 |
| 0.28 | 0.27 | — | 2.0 | 50 | 60 | 90 | 0.25 | 0.27 | — | 0.9 |
|  |  |  |  | 100 | 60 | 70 | 0.16 | 0.25 | — | 1.1 |
| 0.29 | — | 0.29 | 0.37 | 50 | 60 | 87 | 0.25 | — | 0.04 | 0.08 |

[a]3.0–5.0 gm of catalyst heated in 50 ml aqueous solutions of 0.5 M oxalic acid. Catalysts in the form of 1/16 inch extrudates.
[b]The recovered catalysts were rinsed with five 100 ml aliquots of distilled $H_2O$ and then dried at 120° C. for 16 hours.
[c]Error limits are 10.02 wt. %.

After 60 min. at 50° C., approximately 10% of the $Al_2O_3$ support is solubilized by a 0.5M oxalic acid solution. Extractions carried out at 100° C. dissolve 30–40% of the $Al_2O_3$ support in 60 mins. These substantial support losses are too high for oxalic acid to be seriously considered as an extraction agent for metal contaminants. During extractions carried out at higher temperatures (ca. 100° C.), a sizeable fraction of the noble metal components are co-extracted along with the iron. The loss of Re is particularly noticeable and cannot be controlled by lowering the extraction temperature or decreasing the concentration of the oxalic acid solution.

EXAMPLE 5

In contrast to Example 4, selective extraction of iron from noble metal catalysts using buffered oxalic acid is shown herein. The results of studies using ammonium acetate buffered oxalic acid solutions for extracting iron from Pt, Pt/Ir and Pt/Re catalysts are summarized in Table 5. Prior to extraction with buffered oxalic acid solutions, the iron contaminated catalysts were typically reduced under $H_2$.

TABLE 5

Selective Removal of Iron from Alumina Supported Noble Metal Catalysts Using Ammonium Acetate Buffered Oxalic Acid Solutions

| Starting Catalyst (wt. % Metals)[d] | | | | Treatment[a] | | Recovered[b] Catalyst | Extracted Catalysts (wt. % Metals)[d] | | | |
|---|---|---|---|---|---|---|---|---|---|---|
| Pt | Ir | Re | Fe | T °C. | min | (wt. %) | Pt | Ir | Re | Fe |
| 0.29 | — | — | 0.35 | 50 | 60 | 98 | 0.29 | — | — | 0.09 |
|  |  |  |  | 100 | 60 | 96 | 0.30 | — | — | 0.12 |
| 0.28 | 0.26 | — | 0.35 | 50 | 60 | 96 | 0.30 | 0.28 | — | 0.10 |
| 0.28 | 0.27 | — | 2.0 | 50 | 60 | 98 | 0.30 | 0.30 | — | 1.5 |
|  |  |  |  | 50[c] | 60[c] | 97 | 0.29 | 0.30 | — | 0.9 |
|  |  |  |  | 100 | 60 | 100 | 0.26 | 0.29 | — | 1.6 |
|  |  |  |  | 100[c] | 60[c] | 98 | 0.28 | 0.28 | — | 1.2 |

TABLE 5-continued

Selective Removal of Iron from Alumina Supported Noble Metal
Catalysts Using Ammonium Acetate Buffered Oxalic Acid Solutions

| Starting Catalyst (wt. % Metals)[d] | | | | Treatment[a] | | Recovered[b] Catalyst | Extracted Catalysts (wt. % Metals)[d] | | | |
|---|---|---|---|---|---|---|---|---|---|---|
| Pt | Ir | Re | Fe | T °C. | min | (wt. %) | Pt | Ir | Re | Fe |
| 0.29 | — | 0.29 | 0.37 | 50 | 60 | 96 | 0.30 | — | 0.29 | 0.08 |

[a] 3.0 gm of catalyst heated in 50 ml aqueous solutions of 0.5 M oxalic acid plus 0.5 M ammonium acetate. Catalysts in the form of 1/16 inch extrudates.
[b] The recovered catalysts were rinsed with five 100 ml aliquots of distilled $H_2O$ and then dried at 120° C. for 16 hrs.
[c] Powdered samples (230(−) mesh) employed in these runs.
[d] Error limits are ±0.02%.

As compared to oxalic acid slurries, buffered oxalic acid solutions do not solubilize the $Al_2O_3$ support. The apparent catalyst losses of 2–4% are due primarily to mechanical losses upon filtering the slurries rather than from solubilization of $Al_2O_3$ in the buffered solution. Iron is selectively extracted and no apparent removal of noble metal occurs even at extraction temperatures of 100° C. The extraction data further indicates that iron removal is favored at lower treatment temperatures. This behavior is consistent with the fact that iron oxalate complexes are more stable at lower temperatures.

The effect of catalyst particle size on extraction efficiency is shown in the case of a 2% iron doped Pt/Ir catalyst. Smaller catalyst particle sizes would be expected to expose more surface to the extraction media. Thus, under a given set of extraction conditions, the removal of iron and other extractable contaminants should become more favorable with decreasing particle sizes. The enhanced removal of iron from the powdered catalyst is in agreement with these arguments.

The extraction data reported in Table 5 were obtained from crude slurry experiments and were not optimized. It is reasonable to assume, however, that essentailly all the iron present on a particular catalyst could be removed by either recycling the catalyst to fresh extraction media or by devising an extraction procedure whereby the catalyst is continuously contacted wth a buffered oxalic acid solution. The use of buffered oxalic acid solutions can also be applied for the removal of iron and other extractable metals such as Na, V, Ni, Cu and the like from a wide range of hydrocarbon conversion catalysts. While oxalic acid removal is preferred for metal contaminant removal, it may be possible to substitute other organic acids in the process of the invention.

EXAMPLE 6

It is known that iron can act as a poison for noble metal catalysts. This example demonstrates the beneficial effect of iron removal on the chemisorption behavior of a Pt/Re catalyst. The results are shown in Table 6.

TABLE 6

Chemisorption Properties of Iron Extracted, Alumina Supported Noble Metal Catalysts

| | Catalysts Wt. % Metals | | | | Adsorbate/Metal Ratios[a] | | |
|---|---|---|---|---|---|---|---|
| | Pt | Ir | Re | Fe | H/M | CO/M | Catalyst History |
| (A) | 0.3 | 0.3 | — | — | 1.7 | 1.2 | Fresh commercial sample |
| (B) | 0.28 | 0.26 | — | 0.35 | 1.1 | 0.9 | Redispersed commercial catalyst |
| (C) | 0.30 | 0.28 | — | 0.10 | 0.8 | 0.7 | Catalyst (B) extracted with ammonium acetate buffered oxalic acid solution at 50° C. |
| (D) | 0.3 | — | 0.3 | — | 0.4 | 0.7 | Fresh commercial sample |
| (E) | 0.29 | — | 0.29 | 0.37 | 0.2 | 0.3 | Iron doped laboratory sample |
| (F) | 0.30 | — | 0.29 | 0.08 | 0.4 | 0.6 | Catalysts (E) extracted with ammonium acetate buffered oxalic acid solution at 50° C. |

[a] Atoms of hydrogen and molecules of carbon monoxide chemisorbed per metal atom in the catalysts at room temperature. Prior to chemisorption measurements the catalysts were reduced at 500° C. under $H_2$ (500 cc/min) for 2 hrs.

Addition of 0.37% iron to a fresh Pt/Re catalyst reduced the $H_2$ and CO uptakes by about 50%. Extraction of the iron doped catalyst with an ammonium acetate buffered oxalic acid solution at 50° C. lowered the iron concentration from 0.37 to 0.08%. The extracted catalyst was calcined at 500° C. under 20% $O_2$/He for 4 hours to insure removal of any last traces of extraction agent from the catalyst surface. Following the extraction-calcination steps, the chemisorption uptakes were increased to values near those exhibited by the fresh catalyst. Restoration of the chemisorption values of the Pt/Re catalyst upon iron removal indicates that the buffered oxalic acid extraction agent neither poisons nor modifies the metal surface.

The redispersed Pt/Ir catalyst exhibited hydrogen and carbon monoxide uptakes lower than those given by a fresh catalyst. X-ray diffraction measurements on the redispersed catalyst did not exhibit any Pt or Ir diffraction patterns, thus it is reasonable to assume that the catalyst is well-dispersed. The presence of 0.35% iron on the redispersed catalyst may therefore be responsible for the anomolously low hydrogen and carbon monoxide uptakes. Extraction of the iron from the catalyst with an ammonium acetate buffered oxalic acid solution lowered the iron concentration from 0.35 to 0.10%. Following the standard extraction procedure, the catalyst was calcined at 270° C. under 20% O₂/He for 4 hours. The iron extracted and calcined Pt/Ir catalyst exhibited hydrogen and carbon monoxide uptakes which were somewhat below those given by the redispersed catalyst. Since the iron extracted catalyst was subjected to only a 270° C. calcination step, the low chemisorption values may result from residual extraction agents adhering to the metal surface. The low chemisorption values displayed by the extracted catalyst did not, as will be described subsequently, affect the reforming activity of this catalyst. This finding suggests that residual extraction agents can be removed from the catalyst at the higher reforming temperatures.

EXAMPLE 7

The naphtha reforming activies of a redispersed Pt/Ir catalyst (containing 0.35% Fe) is compared in this example with a fresh Pt/Ir catalyst and one with the Fe extracted. The results are shown in Table 7. The reforming reaction conditions are described in Example 2.

TABLE 7

Naphtha Reforming Activites of Iron Extracted, Alumina Supported Pt/Ir Catalysts

| Catalyst[a] | Hrs on Feed | RON[b] | RCA[c] |
|---|---|---|---|
| (A), fresh catalyst | 72 | 103.1 | 176 |
|  | 143 | 102.2 | 143 |
|  | 215 | 101.5 | 124 |
|  | 335 | 101.8 | 134 |
|  | 455 | 101.6 | 126 |
| (B), Redispersed catalyst containing 0.35% Fe | 64 | 99.9 | 91 |
|  | 136 | 97.2 | 60 |
|  | 208 | 95.0 | 48 |
|  | 328 | 93.3 | 40 |
|  | 400 | 92.6 | 39 |
| (C), iron extracted from catalyst (B) | 65 | 104.7 | 258 |
|  | 137 | 103.1 | 176 |
|  | 209 | 102.5 | 155 |
|  | 305 | 101.2 | 117 |
|  | 401 | 100.3 | 97 |
|  | 449 | 100.3 | 97 |

[a]See Table 6 for complete catalyst specifications
[b]RON = research octane number
[c]RCA = relative catalyst activity After 400 hr on feed, the redispersed catalyst displayed a reforming activity only about 30% of that of a fresh catalyst. The reforming activity debit shown by the redispersed catalyst suggests that iron contamination may be an important factor in the deactivation. Following the iron extraction, the reforming activity of the extracted catalyst, after 400 hr. on feed, is about 80% of that of a fresh Pt/Ir catalyst. Thus, removal of iron from the redispersed sample yields a markedly more active catalyst.

The detrimental effect of 0.37% iron on the reforming activity of a Pt/Re catalyst is shown in Table 8.

TABLE 8

Naphtha Reforming Activites of Iron Extraced, Alumina Supported Pt/Re Catalysts

| Catalyst[a] | Hrs on Feed | RON[b] | RCA[c] |
|---|---|---|---|
| (D), fresh catalyst | 65 | 102.1 | 142 |
|  | 137 | 100.3 | 93 |
|  | 208 | 98.5 | 72 |
|  | 329 | 97.4 | 61 |
|  | 401 | 96.9 | 57 |
| (E), iron doped catalyst containing 0.37% Fe | 63 | 99.2 | 80 |
|  | 135 | 96.0 | 53 |
|  | 207 | 94.1 | 45 |
|  | 278 | 91.7 | 36 |
|  | 326 | 90.0 | 32 |
|  | 350 | 89.5 | 30 |
| (F), iron extracted from catalyst (E) | 64 | 102.5 | 155 |
|  | 136 | 101.3 | 119 |
|  | 208 | 99.9 | 91 |
|  | 327 | 98.5 | 72 |
|  | 399 | 98.3 | 66 |
|  | 423 | 97.4 | 61 |

[a]See Table 6 for complete catalyst specifications
[b]RON = research octane number
[c]RCA = relative catalyst activity The reforming activity of the iron doped catalyst, after 350 hours on feed, is only 50% of that of a fresh catalyst. The same iron doped catalyst demonstrated 50% lower hydrogen and carbon monoxide uptakes than a fresh catalyst (see Table 6). Thus, excellent agreement between catalytic activity and chemisorption measurements exists for Pt/Re catalysts contaminated with iron. Extraction of 80% of the iron from the iron doped Pt/Re catalyst yields a catalyst which exhibits hydrogen and carbon monoxide uptakes and reforming activity near those shown by a fresh catalyst. The agreement between chemisorption values and catalytic reforming activites indicate that iron poisons bimetallic catalysts by interacting with the metal components. The fraction of noble metals rendering inactive by iron increases with increasing iron concentration.

EXAMPLE 8

This example shows that mineral acids are not equivalent to oxalic acid for iron removal from catalysts. A catalyst contaning 0.28% Pt, 0.27% Ir and 2.0% Fe on an Al₂O₃ support was treated with hydrochloric acid and hydrochloric acid buffered with ammonium acetate with the results shown in Table 9.

TABLE 9

| Treatment[a] Solution | pH | Recovered[b] Catalyst (Wt. %) | Recovered Catalyst (Wt. % metals) Pt | Ir | Fe |
|---|---|---|---|---|---|
| 50 ml. of 0.5 M HCl | 1.0 | 83 | 0.25 | 0.26 | 1.6 |
| 50 ml. of 0.25 M HCl/0.25 ammonium acetate | 3.0 | 93 | 0.27 | 0.27 | 1.9 |

[a]3.0 g. of catalyst (1/16" extrudates) were heated at 100° C. for 60 min.
[b]Recovered catalysts were rinsed with five 100 ml. aliquots distilled water and dried at 120° C. for 16 hours.

These results demonstrate that buffered HCl solutions cause large support losses without significant removal of iron.

EXAMPLE 9

This example shows that oxalic acid buffered with ammonium acetate is a more selective iron extraction media than oxalic acid containing aluminum oxalate. The oxalic acid/aluminum oxalate system has been described in Appell in U.S. Pat. No. 2,704,281 to selectively extract iron from contaminated Pt/Al₂O₃ reforming catalysts. For comparative purposes, the following two slurries were prepared.

(1) 5.0 gm of an alumina based catalyst containing 0.27% Ir, 0.28% Pt and 2.0% Fe were added to a 50 ml solution of 0.5M oxalic acid/0.25M aluminum oxalate. After stirring for 15 minutes the pH (23° C.) of this slurry was 0.71.

(2) 5.0 gm of an alumina based catalyst containing 0.27% Ir, 0.28% Pt and 2.0% Fe were added to a 50 ml solution of 0.25M oxalic acid/0.25M ammonium acetate. After stirring for 15 minutes the pH (23° C.) of this slurry was 3.54.

The above two slurries were heated at 80° C. for 1.0 hr. with stirring and then decanted. Fresh 50 ml solutions of 0.25M oxalic acid/0.25M aluminum oxalate and 0.25M oxalic acid/0.25M ammonium acetate was added to the catalysts, respectively. The slurries were again heated to 80° C. with stirring for 1.0 hr. After 1.0 hr. the pH of slurry (1) measured 1.61, while that of slurry (2) measured 4.07. The two slurries were decanted a second time and fresh 50 ml extraction solutions were added to the catalysts. A third extraction, as above, was carried out. Following the third extraction the catalyst was separated by decanting, rinsed four times with distilled $H_2O$ and dried at 120° C. for 16 hours. The results of the multiple extractions are shown in Table 10 below.

TABLE 10

Removal of Iron from Noble Metal Containing Catalysts

| Treatment Solution | pH (at 80° C.) | Recovered Catalyst (Wt. %) | Recovered Catalyst (Wt. % metals) | | |
|---|---|---|---|---|---|
| | | | Ir | Pt | Fe |
| (1) 50 ml 0.25 M oxalic acid/0.25 M aluminum oxalate | 1.61 | 58 | 0.24 | 0.13 | 0.40 |
| (2) 50 ml 0.25 M oxalic acid/0.25 M ammonium acetate | 4.07 | 95 | 0.28 | 0.27 | 1.1 |
| starting catalyst composition | | | 0.27 | 0.28 | 2.0 |

The results summarized in Table 10 clearly show that extraction solution (1) containing 50 ml of 0.25M oxalic acid/0.25M aluminum oxalate is not acting as a buffer because the pH remains at a low vaalue of 1.61. Extraction solution (2), however, which is an extraction media of the presently claimed invention, buffers the extraction slurry at a relatively high value of 4.07. The low pH exhibited by extraction solution (1) results in solubilization of more than 40 wt.% of the alumina support material. Such excessive loss in support material is well known to cause severe decreases in bifunctional reforming activity. In contrast, treatment solution (2) consisting of a 50 ml solution of 0.25M oxalic acid/0.25M ammonium acetate results in only a 5wt.% loss in catalyst. This 5 wt.% loss in catalyst is most likely associated with mechanical losses which occurred during decanting and rinsing and not due to solubilization of the alumina support. The 0.25M oxalic acid/0.25M aluminum oxalate extraction solution also extracted substantial quantities of Pt and Ir along with the Fe contaminant. The preferred 0.25M oxalic acid/0.25M ammonium acetate treatment solution was in contrast found to selectively remove iron.

EXAMPLE 10

This example, the conditions and ingredients of which are shown in Table 11 below, shows that oxalic acid buffered with a salt of a strong acid, such as ammonium oxalate, does not adequately suppress the solubilization of an inorganic support susceptible to acid attack, such as alumina.

TABLE 11

DISSOLUTION OF ALUMINA - COMPARISON OF AMMONIA OXALATE AND AMMONIUM ACETATE BUFFERED OXALIC ACID SOLUTIONS

| Solution[a] | acid/salt conc. (mole/l) | pH (23° C.) neat | pH (23° C.) 5.0 gm $Al_2O_3$ added[b] | $Al_2O_3$[c] Recovered (%) |
|---|---|---|---|---|
| $HO_x$ | 0.5/0 | 1.15 | 1.19 | 83 |
| $HO_x + AmO_x$ | 0.25/0.25 | 2.37 | 2.73 | 93 |
| $HO_x + AmAcet$ | 0.25/0.25 | 2.81 | 3.49 | 100 |
| distilled $H_2O$ | — | 6.77 | 5.41 | 100 |

[a]$HO_x$ = oxalic acid; $AmO_x$ = ammonium oxalate; $AmAcet$ = ammonium acetate. The 0.25/0.25 molar acid/salt concentrations are the preferred buffer concentration of the instant invention.
[b]5.0 gm of $\gamma$-$Al_2O_3$ was added to 50 ml of buffer solution containing 25 ml each of 0.5 M oxalic acid and 0.5 M ammonium oxalate or ammonium acetate. In the case of oxalic acid only, 25 ml of 0.5 M acid was used to maintain equivalent acid concentration throughout. pH measurements were obtained after digesting at 23° C. for 1.0 hr.
[c]Following the 1.0 hr digesting at 23° C. the $\gamma$-$Al_2O_3$ containing solutions were gently refluxed (~100° C.) for an additional 1.0 hr. After refluxing the $Al_2O_3$ was collected, carefully rinsed free of buffer solution, dried and weighed.

Although the above Table II shows that about 7wt.% of alumina support is lost by use of oxalic acid buffered with ammonium oxalate, it must be appreciated that this is only for one cycle. Multiple cycles, which would be required for commercial operation, will result in substantial losses of support and correspondently severe loses in catalyst activity. This 7 wt.% loss is at least 5 times greater than loses attributable to mechanical attrition. Consequently, such substantial loses must occur by solubilization of alumina support at the relatively low pH of 2.73. Furthermore, the data in Table 11 clearly shows that oxalic acid extraction solution must be buffered to a pH greater than about 3 to effectively suppress solubilization of support material.

What is claimed is:

1. A process for removing metal contaminants from a hydroconversion catalyst containing at least one metal from Groups VIB, VIIB or VIII supported on a refractory inorganic oxide which is susceptible to acid attack which process comprises contacting the contaminated catalyst at a temperature from about 0° C. to 100° C. with a buffered oxalic acid solution having a pH from about 3 to about 10, wherein the oxalic acid concentration is from about 0.0001M to 5M.

2. The process of claim 1 wherein the oxalic acid solution is buffered to a pH of about 3 to about 8.5.

3. The process of claim 2 wherein the oxalic acid concentration is from about 0.01M to 2M.

4. The process of claim 1 wherein the oxalic acid solution is buffered with an ammonium salt selected from the group consisting of ammonium acetate, ammonium citrate, ammonium formate, ammonium lactate, ammonium valerate, ammonium proprionate, ammonium urate, and mixtures thereof.

5. The process of claim 3 wherein the oxalic acid solution is buffered with an ammonium salt selected from the group consisting of ammonium acetate, ammonium citrate, ammonium formate, ammonium lactate, ammonium valerate, ammonium proprionate, ammonium urate, and mixtures thereof.

6. The process of claim 5 wherein the temperature of contacting is from about 20° C. to about 80° C.

7. The process of claim 1 wherein the catalyst contains at least one metal selected from Co, Mo, Re and the Pt group metals and the support is alumina, silica-alumina, or a zeolite.

8. The process of claim 6 wherein the catalyst contains at least one metal selected from Co, Mo, Re and the Pt group metals and the support is alumina, silica-alumina, or a zeolite.

9. The process of claim 1 wherein the catalyst is contacted with the buffered oxalic acid for a time sufficient to extract metal contaminant without dissolving the support.

10. The process of claim 8 wherein the catalyst is contacted with the buffered oxalic acid for a time sufficient to extract metal contaminant without dissolving the support.

11. The process of claim 1 wherein the buffered oxalic acid solution is a mixture of oxalic acid in an aqueous/non-aqueous solvent system.

12. The process of claim 10 wherein the buffered oxalic acid solution is a mixture of oxalic acid in an aqueous/non-aqueous solvent system.

13. The process of claim 1 wherein the metal contaminant is one or more metals selected from the group consisting of iron, vanadium, nickel, sodium, magnesium, chromium, copper, strontium, lithium, and lead.

14. The process of claim 12 wherein the metal contaminant is one or more metals selected from the group consisting of iron, vanadium, nickel, sodium, magnesium, chromium, copper, strontium, lithium, and lead.

15. The process of claim 1 wherein the contaminant is iron.

16. The process of claim 15 wherein the contaminant is iron.

17. The process of claim 1 wherein the catalyst is a reforming catalyst.

18. The process of claim 16 wherein the catalyst is a reforming catalyst.

19. The process of claim 18 wherein the oxalic acid solution is buffered with ammonium acetate.

* * * * *